United States Patent [19]

Midorikawa

[11] Patent Number: 4,495,153

[45] Date of Patent: Jan. 22, 1985

[54] CATALYTIC CONVERTER FOR TREATING ENGINE EXHAUST GASES

[75] Inventor: Minoru Midorikawa, Tokyo, Japan

[73] Assignee: Nissan Motor Company, Limited, Kanagawa, Japan

[21] Appl. No.: 374,413

[22] Filed: May 3, 1982

[30] Foreign Application Priority Data

Jun. 12, 1981 [JP] Japan ............................. 56-85491

[51] Int. Cl.$^3$ .............................................. F01N 3/10
[52] U.S. Cl. ............................. 422/171; 55/DIG. 30; 60/302; 422/176; 422/180
[58] Field of Search ................................. 422/170–172, 422/176, 177, 179, 180; 60/299, 302; 55/484, 486, 498, DIG. 30

[56] References Cited

U.S. PATENT DOCUMENTS

| | | | |
|---|---|---|---|
| 3,607,133 | 9/1971 | Hirao et al. | 422/171 |
| 3,730,691 | 5/1973 | Lang et al. | 422/172 X |
| 3,860,535 | 1/1975 | Johnson | 422/170 X |
| 3,929,418 | 12/1975 | Wood | 422/171 |
| 3,929,419 | 12/1975 | Chapman | 422/171 |
| 4,004,887 | 1/1977 | Stormont | 422/179 |
| 4,209,494 | 6/1980 | Oya et al. | 422/179 |
| 4,278,639 | 7/1981 | Tadokoro et al. | 422/179 X |
| 4,353,873 | 10/1982 | Noritake et al. | 422/179 |

Primary Examiner—Richard L. Chiesa

[57] ABSTRACT

A catalytic converter for treating engine exhaust gas includes a carrier and a casing housing the carrier. The carrier has opposite first and second ends and is formed therethrough with a plurality of passageways extending from the first to the second end of the carrier. The passageways have opposite first and second ends respectively. The first ends of the passageways are at the first end of the carrier. The second ends of the passageways are at the second end of the carrier. The casing and the second end of the carrier define a space, inside the casing, through which the second ends of the passageways communicate in common. An inlet tube is connected to the casing in such a manner as to directly communicate with a part of the first ends of the passageways, in order to supply the engine exhaust gas thereto. An outlet tube is connected to the casing in such a manner as to directly communicate with another part of the first ends of the passageways. First catalyst is carried on a part of the carrier including the passageways which directly communicate with the inlet tube. Second catalyst is carried on another part of the carrier including the passageways which directly communicate with the outlet tube. The engine exhaust gas flows past the inlet tube, a part of the passageways relating to the first catalyst, the space inside the casing, another part of the passageways relating to the second catalyst, and the outlet tube, in that order.

5 Claims, 10 Drawing Figures

CATALYTIC CONVERTER FOR TREATING ENGINE EXHAUST GASES

BACKGROUND OF THE INVENTION

1. Field of the Invention

This invention relates to a catalytic converter for treating engine exhaust gases.

2. Description of the Prior Art

It is well-known to provide an automotive engine with a catalytic converter to treat engine exhaust gases or convert the gaseous pollutants, such as HC (hydrocarbon), CO (carbon monoxide), and/or $NO_x$ (nitrogen oxides) into harmless gases, such as $H_2O$ (water), $CO_2$ (carbon dioxide), $O_2$ (oxygen), and/or $N_2$ (nitrogen). Some catalytic converters have tandem two sections, handling $NO_x$, HC and CO, respectively. The converters of this type are usually equipped with a secondary air injection system, which supplies additional air into the exhaust gases before they enter the HC/CO section. The additional atmospheric oxygen facilitates burning of HC and CO and thus conversion thereof into harmless gasses in the HC/CO section. However, such conventional converters have been unsatisfactory from the standpoint of compactness.

SUMMARY OF THE INVENTION

Accordingly, it is an object of the present invention to provide a catalytic converter for treating engine exhaust gases which is relatively compact.

In accordance with the present invention, a catalytic converter for treating engine exhaust gas includes a carrier and a casing housing the carrier. The carrier has opposite first and second ends and is formed therethrough with a plurality of passageways extending from the first to the second end of the carrier. The passageways have opposite first and second ends respectively. The first ends of the passageways are at the first end of the carrier. The second ends of the passageways are at the second end of the carrier. The casing and the second end of the carrier define a space, inside the casing, through which the second ends of the passageways communicate in common. An inlet tube is connected to the casing in such a manner as to directly communicate with a part of the first ends of the passageways, in order to supply the engine exhaust gas thereto. An outlet tube is connected to the casing in such a manner as to directly communicate with another part of the first ends of the passageways. First catalyst is carried on a part of the carrier including the passageways which directly communicate with the inlet tube. Second catalyst is carried on another part of the carrier including the passageways which directly communicate with the outlet tube. The engine exhaust gas flows past the inlet tube, a part of the passageways relating to the first catalyst, the space inside the casing, another part of the passageways relating to the second catalyst, and the outlet tube, in that order.

The above and other objects, features and advantages of the present invention will be apparent from the following description of preferred and alternative embodiments thereof, taken in conjunction with the drawings.

DESCRIPTION OF THE PREFERRED EMBODIMENTS

Figure 1:
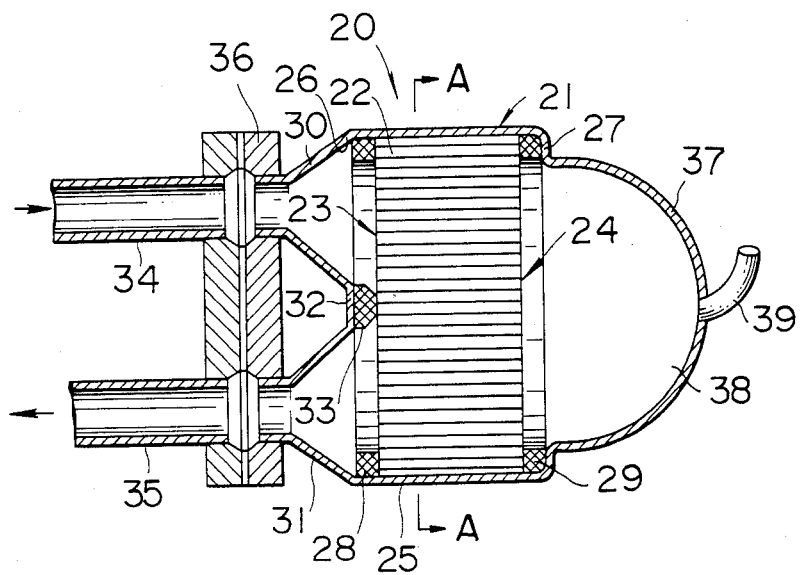
FIG. 1 is a longitudinal section of a catalytic converter according to a first embodiment of the present invention.
Figure 2:
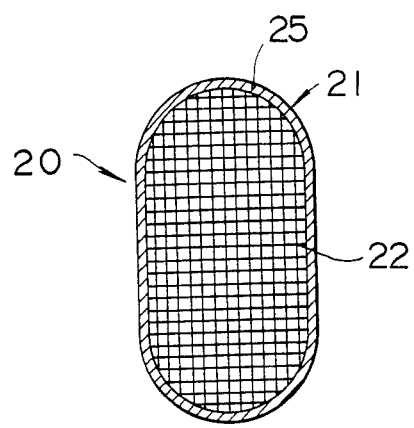
FIG. 2 is a cross-section of the catalytic converter taken along line A—A of FIG. 1.

With reference to FIGS. 1 and 2, there is shown a catalytic converter 20 for treating engine exhaust gases according to a first embodiment of the present invention. The converter 20 includes a casing 21 and a cylindrical monolithic carrier 22 of elliptical cross-section disposed within the casing 21. The carrier 22 is formed therethrough with a plurality of isolated parallel passageways axially extending from one end face 23 to the opposite end face 24 of the carrier 22. The carrier 22 has two type catalysts on its surfaces, as will be described in more detail hereinafter, to serve as a substrate for the catalysts.

The casing 21 includes a hollow cylindrical portion 25 of elliptical cross-section, which conforms to the cross-section of the carrier 22 so that the cylindrical portion 25 will snugly fit around the periphery of the carrier 22. One end of the cylindrical portion 25 near the carrier end face 23 is provided with a peripheral inward-bent or inward-turn 26. The other end of the portion 25 near the carrier end face 24 is provided with a peripheral inward-step 27. An annular spacer 28 is located between the peripheral bent 26 of the casing 21 and the end face 23 of the carrier 22. Another annular spacer 29 is located between the peripheral step 27 of the casing 21 and the end face 24 of the carrier 22. The bent 26 and the step 27 cooperate to axially secure the carrier 22 therebetween with the help of the spacers 28 and 29. The spacers 28 and 29 are made of such material or have such internal structures that can serve as bumpers.

One end of an inlet tube 30 is connected to the end of cylindrical portion 25 near the carrier end face 23 in such a manner as to face substantially-semicircular half of the carrier end face 23. One end of an outlet tube 31 is connected to the end of cylindrical portion 25 near the carrier end face 23 in such a manner as to face the other half of the carrier end face 23. These ends of the inlet and outlet tubes 30 and 31 have therebetween a common wall or seam 32 extending diametrically with respect to the carrier 22. The annular spacer 28 is provided with a diametrical bridge 33. The bridge 33 extends along the common wall 32 and is located between the common wall 32 and the carrier end 23 in contact with both, sealingly separating the ends of the inlet and outlet tubes from each other and preventing direct communication between the ends of the inlet and outlet tubes. Thus, the inlet tube 30 communicates directly with only half of the ends of the carrier passageways at the corresponding half of the carrier end face 23. The outlet tube 31 communicates directly with only the other half of the ends of the carrier passageways at the corresponding other half of the carrier end face 23. The bridge 33 prevents direct communication between the halves of the ends of the carrier passageways. The inlet and outlet tubes 30 and 31 are preferably formed integrally with the portion 25 of the casing 21. For example, the end of the cylindrical portion 25 tapers into two funnels starting at the peripheral bent 26 and the wall 32, and the funnels constitute the inlet and outlet tubes 30 and 31 respectively.

The distal end of the inlet tube 30 is connected to one end of an upstream exhaust pipe 34, the other end of which is connected in turn to engine combustion chambers (not shown). The distal end of the outlet tube 31 is connected to one end of a downstream exhaust pipe 35, the other end of which in turn leads to the atmosphere. A flange 36 supports the junction of the tube 30 and the pipe 34, and that of the tube 31 and the pipe 35.

The casing 21 includes a cup-shaped portion 37, which is coaxially connected to the end of the cylindrical portion 25 near the carrier end face 24 in such a manner as to close the end of the portion 25. The portion 37 and the carrier end 24 define a substantially hemispherical space 38 inside the casing 21. Substantially all the ends of the carrier passageways at the carrier end 24 face the space 38, and thus are connected in common via the space 38. One end of a secondary air injection tube 39 is connected to the portion 37 of the casing 21 in such a manner as to communicate with the space 38, in order to supply air into the space 38. The other end of the tube 39 is connected, for example, to a conventional secondary air pump (not shown). The portion 37 is preferably formed integrally with the portion 25 of the casing 21 and extends from the peripheral step 27.

A $NO_x$-converting catalyst coats the surfaces of the part of the carrier 21 which includes the carrier passageways directly connected to the inlet tube 30. A HC/CO-converting catalyst coats the surfaces of the rest of the carrier which includes the other half of the carrier passageways directly connected to the outlet tube 31.

In operation, exhaust gases are delivered from the engine combustion chambers into the casing 21 via an exhaust manifold (not shown), the exhaust pipe 34, and the inlet tube 30. After leaving the inlet tube 30, the exhaust gases enter and pass through the half of the carrier passageways which are directly connected to the inlet tube 30. Since this half of the carrier passageways are defined by the $NO_x$-catalyst-coated walls. $NO_x$ in the exhaust gases are converted into harmless gases while passing through these carrier passageways. The bridge 33 prevents direct egress of the exhaust gases from the inlet tube 30 to the outlet tube 31. After passing through these carrier passageways, the exhaust gases enter the space 38 and mix with additional air supplied via the secondary air injection tube 39. Since all the ends of the carrier passageways at the carrier end 24 are connected in common via the space 38, the exhaust gases thereafter enter the other half of the carrier passageways which are directly connected to the outlet tube 31. The exhaust gases flow through the other half of the carrier passageways before entering the outlet tube 31. Since this half of the carrier passageways are defined by the HC/CO-catalyst-coated walls, HC and CO in the exhaust gases are converted into harmless gases while passing through these carrier passageways. The additional atmospheric oxygen from the secondary air injection tube 39 encourages burning or conversion of HC and CO into harmless gases. The treated exhaust gases are discharged to the atmosphere through the outlet tube 31 and the exhaust pipe 35. Since the carrier passageways are isolated from each other, the exhaust gases must pass through the $NO_x$-catalyst-coated passageways and also then pass through the HC/CO-catalyst-coated passageways.

Since the casting 21 snugly fits around the periphery of the carrier 22, undesirable gaps therebetween are negligibly small. These small gaps between the casing 21 and the carrier 22 reduce the amount of exhaust gases bypassing the carrier 22 and thus the amount of non-treated exhaust gases. The spacers 28 and 29, preferably, close the undesirable gaps to further reduce the amount of non-treated gases.

Figure 3:
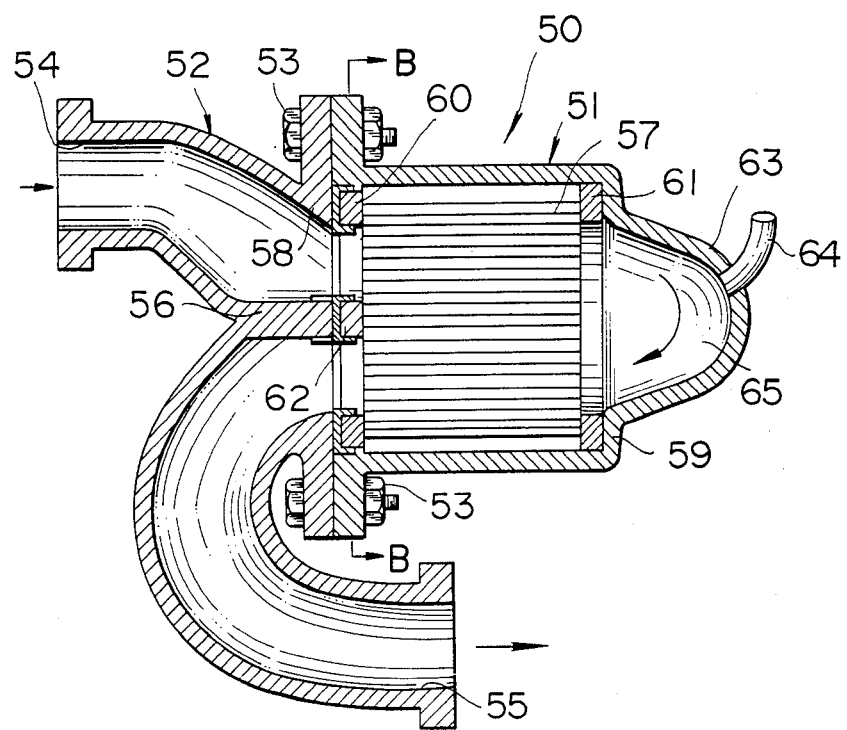
FIG. 3 is a longitudinal section of a catalytic converter according to a second embodiment of the present invention.
Figure 4:
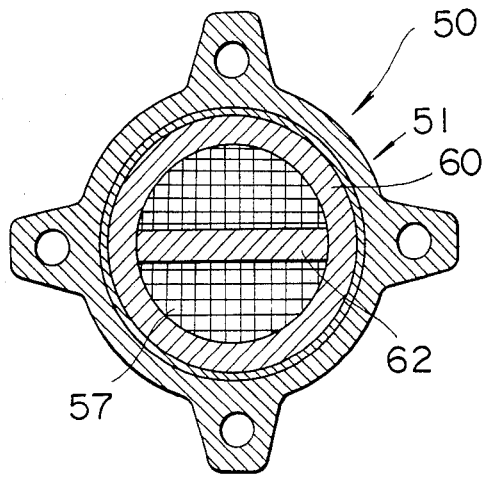
FIG. 4 is a cross-section of the catalytic converter taken along line B—B of FIG. 3.

FIGS. 3 and 4 show a catalytic converter 50 according to a second embodiment of the present invention. This converter 50 is designed in a manner similar to that of the previous first embodiment except for the following points.

A hollow cylindrical casing 51 of the converter 50 is bolted to an exhaust manifold 52 at 53. The exhaust manifold 52 has inlet and outlet ports 54 and 55 separated by a partition wall 56. One end of the inlet port 54 is in turn connected to engine combustion chambers (not shown), the other end thereof being connected to the casing 51. One end of the outlet port 55 in turn leads to the atmosphere, the other end thereof being connected to the casing 51.

The casing 51 coaxially houses a cylindrical monolithic carrier 57. The exhaust manifold 52 forms a peripheral inward-step 58 adjacent to the casing 51. The casing 51 is provided with a peripheral inward-step 59 near the end remote from the exhaust manifold. A ring-shaped bumper or spacer 60 is located between the step 58 and the carrier 57. Another ring-shaped bumper or spacer 61 is located between the step 59 and the carrier 57. The steps 58 and 59, i.e. the exhaust manifold 52 and the casing 51, cooperate to firmly hold the carrier 57 therebetween with the help of the spacers 60 and 61.

The spacer 60 has a diametrical bridge 62, which contacts both the partition wall 56 and the carrier 57 to prevent direct communication between the inlet and outlet ports 54 and 55. Thus, the inlet port 54 directly communicates with half of passageways through the carrier 57, while the outlet port 55 directly communicates with the other half.

The end of the casing 51 remote from the exhaust manifold 52 is closed by a cup-shaped member 63 of the casing 51 in a manner similar to that of the previous first embodiment. A secondary air injection tube 64 is connected to the member 63 to communicate with an inside space 65 defined by the member 63 and the end face of the carrier 57.

Figure 5:
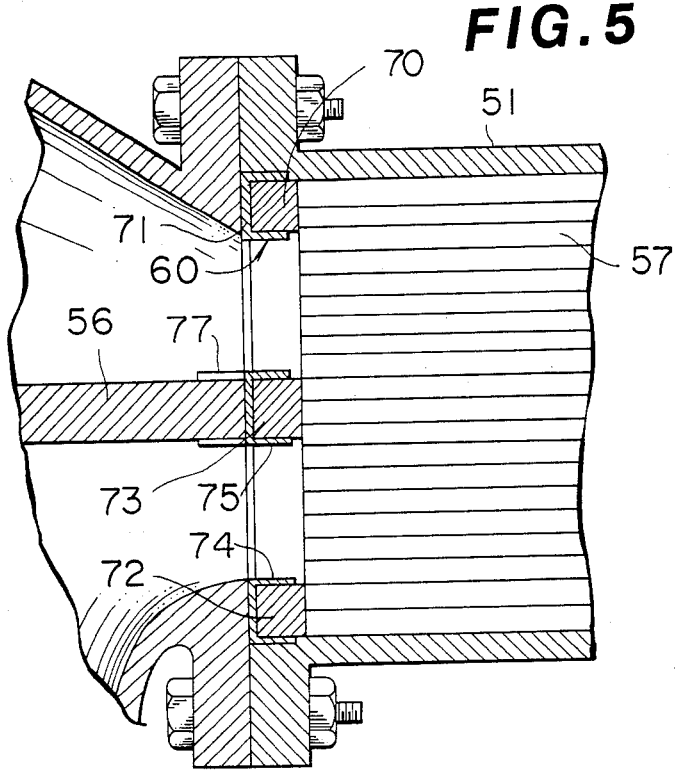
FIG. 5 is an enlarged view of a portion of FIG. 3 showing the connection of the catalytic converter to the exhaust manifold.
Figure 6:
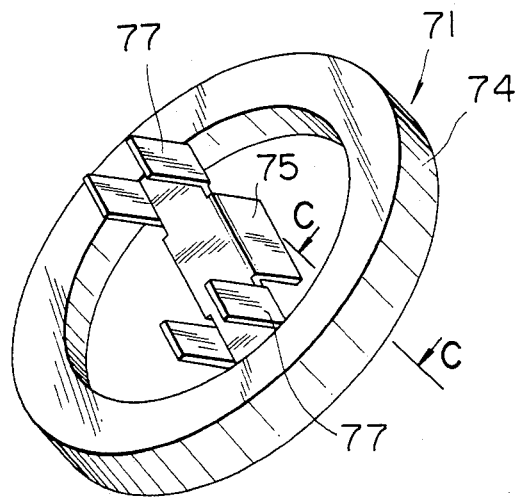
FIG. 6 is a perspective view of the retainer of FIG. 5.
Figure 7:
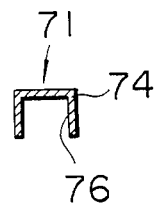
FIG. 7 is a section of the retainer taken along line C—C of FIG. 6.

As shown in FIGS. 5 to 7, the spacer 60 consists of a bumper member 70 and a retainer 71 holding the member 70. The bumper member 70 has an annular portion 72 and a diametrical portion 73 connected at its both ends to the annular portion 72. The portions 72 and 73 are of rectangular cross-section.

The retainer 71 has an annular portion 74 and a diametrical portion 75 connected at its both ends to the annular portion 74. The portions 74 and 75 of the retainer 71 correspond to the portions 72 and 73 of the bumper member 70 respectively. The annular portion 74 is of rectangular U-shaped cross-section and thus has an annular groove 76 with a depth parallel to the central axis of the annular portion 74. The groove 76 has dimensions similar to those of the annular portion 72 of the bumper member 70 so as to snugly receive the latter. The diametrical portion 75 also has a rectangular U-shaped cross-section and thus a groove which is of dimensions similar to those of the diametrical portion 73 of the bumper member 70 to snugly receive the portion 73. The groove in the portion 75 points similarly to the groove 76 in the portion 74. Opposite ends of the diametrical portion 75 are formed with U-shaped members 77 respectively, for example, which are made by folding. Each member 77 has a groove of rectangular cross-section which points oppositely to the other groove in the portion 75 and the groove in the annular portion 74. The grooves in the U-shaped members 77 have dimensions similar to those of the end of the partition wall 56 to snugly receive the latter.

The portions 72 and 73 of the bumper member 70 are inserted into the respective grooves in the portions 74 and 75 of the retainer 71. The partition wall 56 of the exhaust manifold 52 is inserted into the U-shaped sections 77 of the retainer 71. Thus, the retainer 71 holds the bumper member 70 and the partition wall 56, securing the member 70 to the wall 56. The bottom walls of the retainer portions 74 and 75 are sandwiched between the exhaust manifold 52 and the bumper member 70. The bumper member 70 slightly protrudes from the retainer 71 and contacts the carrier 57 to prevent direct contact of the retainer 71 with the carrier 57.

Figure 8:
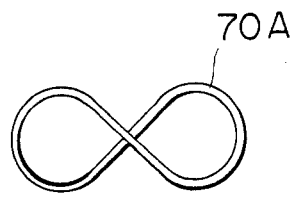
FIG. 8 is a plan view of an alternative bumper member.
Figure 9:
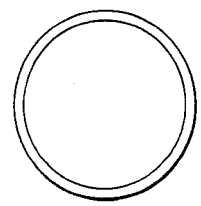
FIG. 9 is a plan view of the bumper member of FIG. 8 in its original condition.

FIG. 8 shows an alternative bumper member 70A, which is in the form of the numeral "8". One loop of the member 70A is located at the end of an inlet tube or exhaust manifold inlet port (neither shown), and the other loop is at the end of an outlet tube or exhaust manifold outlet port (neither shown). It is necessary to adapt the retainer to hold the member 70A. For example, the original shape of the member 70A may be circular as shown in FIG. 9. After the member 70A is deformed into the numeral "8", the point of overlap should be compressed so as to have the same thickness as the rest of the member 70A.

Figure 10:
FIG. 10 is a plan view of another alternative bumper member in its original condition.

The original shape of the member 70A may be linear as shown in FIG. 10. In this case, after the member 70A is deformed into the numeral "8", the adjacent ends thereof are welded together.

It should be understood that further modifications and variations may be made in the present invention without departing from the spirit and scope of the present invention as set forth in the appended claims.

What is claimed is:

1. A catalytic converter for treating engine exhaust gas, comprising:
   (a) a carrier having opposite first and second ends and being formed with a plurality of passageways extending from the first to the second end of the carrier, the passageways having opposite first and second ends respectively, the first ends of the passageways being at the first end of the carrier, the second ends of the passageways being at the second end of the carrier;
   (b) a casing housing the carrier in such a manner that the casing and the second end of the carrier define a space, inside the casing, through which the second ends of the passageways communicate in common;
   (c) an inlet tube connected to the casing in such a manner as to directly communicate with a part of the first ends of the passageways for supplying the engine exhaust gas thereto;
   (d) an outlet tube connected to the casing in such a manner as to directly communicate with another part of the first ends of the passageways;
   (e) first catalyst carried on a part of the carrier including the passageways which directly communicate with the inlet tube; and
   (f) second catalyst carried on another part of the carrier including the passageways which directly communicate with the outlet tube;
   (g) a partition wall separating the inlet tube from the output tube;
   (h) a first inward step provided on the casing;
   (i) a second inward step provided on the inlet and outlet tubes, the second inward step being operative to hold the carrier in cooperation with the first inward step;
   (j) an annular bumper member positioned between the carrier and the second inward step;
   (k) a diametrical bumper member contacting the carrier and extending diametrically with respect to the annular bumper member; and
   (l) a retainer holding the diametrical bumper member and the partition wall and thereby securing the diametrical bumper member to the partition wall, the retainer and the diametrical bumper member cooperating to prevent direct communication between the parts of the first ends of the passageways, the retainer having an annular portion and a diametrical portion extending diametrically with respect to the annular portion, the annular portion being positioned between the carrier and the second inward step and having a groove receiving the annular bumper member, the diametrical portion having oppositely directed grooves receiving the diametrical bumper member and the partition wall respectively;
   whereby the engine exhaust gas flows past the inlet tube, a part of the passageways relating to the first catalyst, the space inside the casing, another part of the passageways relating to the second catalyst, and the outlet tube, in that order.

2. A catalytic converter as recited in claim 1, wherein the inlet tube communicates directly with half of the first ends of the passageways and the outlet tube communicates directly with the other half thereof.

3. A catalytic converter as recited in claim 1, further comprising a secondary air injection tube connected to the casing in such a manner as to communicate with the space inside the casing for supplying air into the space.

4. A catalytic converter as recited in claim 1, wherein the first catalyst is of the type suitable for converting $NO_x$ into harmless substances, and the second catalyst is of the type suitable for converting HC and CO into harmless substances.

5. A catalytic converter as recited in claim 1, further comprising another bumper member positioned between the first inward step and the carrier.

* * * * *